US007359685B2

(12) United States Patent
Jafari et al.

(10) Patent No.: US 7,359,685 B2
(45) Date of Patent: Apr. 15, 2008

(54) TRANSMITTING STAGE (75) Inventors: Houman Jafari, Erlangen (DE); Ralf Burdenski, Nuremberg (DE)

(73) Assignee: Fraunhofer-Gesellschaft zur Förderung der angewandten Forschung eV, Munich (DE)

( * ) Notice: Subject to any disclaimer, the term of this patent is extended or adjusted under 35 U.S.C. 154(b) by 484 days.

(21) Appl. No.: 11/127,607

(22) Filed: May 12, 2005

(65) Prior Publication Data
US 2005/0239422 A1 Oct. 27, 2005

Related U.S. Application Data (63) Continuation of application No. PCT/EP03/12523, filed on Nov. 10, 2003.

(30) Foreign Application Priority Data
Nov. 14, 2002 (DE) ............... 102 53 181
Dec. 9, 2002 (DE) ............... 102 57 435

(51) Int. Cl.
*H04B 1/04* (2006.01)
(52) U.S. Cl. ............... 455/126; 455/127.2; 375/300
(58) Field of Classification Search ............... 455/102, 455/108, 110, 126, 127.1, 2; 375/295, 300, 375/297, 301, 302
See application file for complete search history.

(56) References Cited

U.S. PATENT DOCUMENTS

| 4,481,672 A | 11/1984 | Watkinson |
| 4,630,315 A | 12/1986 | Watkinson |
| 6,047,148 A * | 4/2000 | Nagatani et al. ............... 399/66 |
| 6,295,442 B1 * | 9/2001 | Camp et al. ............... 455/102 |
| 6,671,337 B1 * | 12/2003 | Cordoba ............... 375/345 |
| 6,801,784 B1 * | 10/2004 | Rozenblit et al. ............ 455/522 |
| 7,072,421 B2 * | 7/2006 | Bengtsson et al. .......... 375/298 |

(Continued)

FOREIGN PATENT DOCUMENTS

DE 100 29 117 A1 2/2001

(Continued)

OTHER PUBLICATIONS

Mann et al., "Increasing the talk time of mobile radios with efficient linear transmitter architectures," Electronics & Communication Engineering Journal, Apr. 2001, pp. 65-76.

*Primary Examiner*—Edward F. Urban
*Assistant Examiner*—Nhan T Le
(74) *Attorney, Agent, or Firm*—Thomas, Kayden, Horstemeyer & Risley, LLP (57) ABSTRACT

A transmission stage in polar loop technology includes an amplitude regulation means, a phase regulation means, a VCO and a feedback path. In the feedback path a variable amplifier is provided. The amplitude regulation means is further implemented in order to be controlled by a control means according to a request for a power variation in the output signal of the amplifier in order to correspondingly vary an amplitude control signal for the power amplifier. Simultaneously, the control means is implemented in order to correspondingly control the variable feedback path amplifier, so that the amplitude of the output signal of the variable feedback path amplifier remains in a narrowly limited predetermined range. Thus, power variations in the output signal of the amplifier operated in the non-linear area are held remote from the phase locked loop, so that the phase regulation means may be implemented at low cost and operates reliably anyway.

18 Claims, 4 Drawing Sheets

U.S. PATENT DOCUMENTS 7,088,968 B2 * 8/2006 Zipper .................. 455/126
2002/0168020 A1 * 11/2002 Justice et al. ............ 375/295

FOREIGN PATENT DOCUMENTS

| DE | 100 56 472 A1 | 5/2002 |
| EP | 1 211 801 A2 | 6/2002 |
| GB | 2 368 214 A | 4/2002 |
| WO | WO 02/33844 A2 | 4/2002 |
| WO | WO 02/47249 A2 | 6/2002 |

* cited by examiner

| request | GS1 | only GS2 | only GS3 | GS2 and GS3 | |
|---|---|---|---|---|---|
| $P_{out} \uparrow$ | ↓ | ↓ | ↑ | ↓ | ↑ |
| $P_{out} \downarrow$ | ↑ | ↑ | ↓ | ↑ | ↓ |

$$V = \frac{S_{out}(t)}{S_{in}(t)}$$

$$GS_1 = \frac{1}{V}$$

$$GS_3 = 1 + \frac{V}{GS_4}$$

FIGURE 4A
(only GS3)

$$V = \frac{S_{out}(t)}{S_{in}(t)}$$

$$GS_1 = \frac{1}{V}$$

$$GS_3 = 1 - \frac{V}{GS_4}$$

FIGURE 4B
(only GS2)

TRANSMITTING STAGE

CROSS-REFERENCE TO RELATED APPLICATIONS

This application is a continuation of co-pending International Application No. PCT/EP03/12523, filed Nov. 10, 2003, which designated the United States and was not published in English.

BACKGROUND OF THE INVENTION

1. Field of the Invention

The present invention relates to transmitting stages and in particular to transmitting stages including an amplitude locked loop and a phase locked loop in order to amplify an amplitude- and phase-modulated signal via a non-linear power amplifier and, if applicable, transmit the same via a wireless transmission channel.

2. Description of the Related Art

For mobile communication services only a limited number of frequency bands exists. The required channel bandwidth in data transmission and the possible data rate are decisive factors characterizing the effectiveness of a transmission system. Thus, within a frequency band, a maximum data rate is aimed at. Different methods exist which facilitate allowing a higher data rate at the same channel bandwidth and thus enable a more efficient message flow.

In recent years, in the field of mobile communication the GSM (global system for mobile communication) standard became established. Here, a GSMK (Gaussian minimum shift keying) modulation is used. The GMSK counts among the so called CPM (continuous phase modulation) modulation methods. This is a non-linear digital modulation method having a constant amplitude and a continuous phase.

The increase of the message flow may be effected by a change of the modulation method. Here, instead of a GMSK modulation a $3\pi/8$-8PSK (phase shift keying) modulation for the GSM EDGE (enhancement data ratio for GSM evaluation) standard or a QPSK (quadrature phase shift keying) modulation for the UMTS (universal mobile telecommunication system) standard is used. The $3\pi/8$-8PSK modulation and the QPSK modulation contain also an amplitude component apart from the phase modulation. By this, a transmission of additional information for increasing the data rate is possible with the same channel bandwidth.

One critical point in the mobile terminal device is the transmission performance of the RF transmission amplifier with regard to the RF signal to be transmitted for the EDGE and UMTS standard. In contrast to the GMSK modulation, in the $3\pi/8$-8PSK modulation and the QPSK modulation the phase and the amplitude are modulated. The result is a spectral widening of the output signal after the non-linear power amplifier or a clear distortion of the transmission signal, respectively. This leads to an increase of the bit error rate (BER) with the same reception field strength.

In order to minimize these distortions, actually the use of a linear power amplifier would be required. The efficiency of linear amplifiers is, however, with approximately 35% clearly worse as compared to non-linear power amplifiers achieving an efficiency of over 50% up to 60%.

The high energy consumption of the system due to the low efficiency of the components stands in contrast to the aim to achieve operation times of the mobile station which are as long as possible.

Signal reconstruction techniques like polar loop enable the use of non-linear power amplifiers also for the EDGE standard and the UMTS standard.

So-called polar loop transmission circuits are for example described in the U.S. Pat. No. 4,481,672, WO 02/47249 A2, the U.S. Pat. No. 4,630,315 or GB 2368214 A.

Also EP 1211801 A2 discloses a polar loop transmission circuit suitable for future mobile radio systems comprising a phase and amplitude modulation and which may also be used for prior systems according to the GSM standard. The polar loop transmission circuit includes a power amplifier receiving a signal from a VCO on the input side. The control signal for the VCO is gained by amplitude limitation of the transmission signal as the nominal signal and by an amplitude limitation of an actual signal, a subsequent phase comparison of the limited signals and a following low-pass filtering.

The amplitude control signal for the controllable non-linear power amplifier is generated by rectifying the transmission signal as the nominal signal, rectifying the actual signal, a subsequent differential formation by means of a differential amplifier and a subsequent low-pass filtering.

The actual signal is branched for the amplitude regulation and for the phase regulation from the output of the non-linear power amplifier, fed to a programmable amplifier and then mixed down to an intermediate frequency, supplied to a ramp-controllable amplifier and then on the one hand fed into the rectifier for an amplitude regulation an on the other hand into the limiter for a phase regulation.

At the control terminal of the programmable amplifier into which a feedback signal branched from the output is primarily fed, using a control signal the power level at the output of the polar loop transmission circuit may be regulated. Hereby, the programmable amplifier is a linear amplifier linearly attenuating the signal to be supplied at its input. The voltage of the high-frequency signal provided at its output, however, is not linearly dependent on an adjustment signal to be supplied at the control terminal and is e.g. 2 dB per least significant bit change of the adjustment signal.

Typical polar loop transmission circuits, as they are disclosed in EP 1211801 A2, are suitable for cellular radio telephones according to the GSM standard and for alternative modulation methods in which a phase and an amplitude modulation have to take place.

Such cellular mobile radio systems have, as further components, an automatic amplification regulation in so far that in the base station and/or in the mobile part a field strength measurement is performed in order to then upregulate the transmission power of the mobile telephone and/or the base station when it is determined based on a low reception field strength that the currently present transmission channel is not satisfying. As the current consumption is only critical for the mobile parts, often only a transmission power regulation is performed in the mobile part.

So it is desirable on the one hand in the interest of a low bit error rate to use a very high transmission power as thus automatically the signal/noise ratio at the receiver and thus the bit error rate decreases. On the other hand, a high transmission power is not desired due to the increasing resistance from the population. Further, a high transmission power leads to the fact that the cells may only be construed in a relatively coarse-meshed way or that a carrier frequency may not be "re-used" in a cell raster as often as possible, respectively, in order to enable a high number of subscribers in the limited frequency band.

A high transmission power comprises the problem, in particular when using non-linear amplifiers, that side channel interferences may increase, i.e. that a transmitter actually specified for a carrier frequency also sends out power, due to its non-linearity, into a side channel in which it should actually transmit nothing or only below a threshold. Such a transmission device is not in accordance with the regulation when the so-called side channel emission is above a certain specification. So it is for example required for the mentioned EDGE standard that the spectrum of the output signal of the radio device is at a file frequency of +/−200 kHz with regard to a carrier frequency smaller than −54 dBc, and further at an offset frequency of +/−300 kHz with regard to the carrier below −60 dBc.

It is required for the UMTS standard that the spectrum of the output signal is better than −45 dBc in the whole neighboring channel.

All of those requirements seem to indicate that the signal power of the mobile telephone has to be as low as possible, i.e. so small that a required bottom bit error rate is just about fulfilled.

In addition, for mobile telephones the special requirement exists that they have to be cheap, as the mobile telephone market has developed to be an extremely competitive market in which already small savings enabled a system to be capable of surviving, i.e. that the same was accepted by the market, while the other system was not accepted in the market.

For mobile telephones, thus a transmission power regulation is used which is as sensitive as possible, which in case of a good transmission channel reduces the transmission power as fast and as far as possible, which, however, is also able, in case of a mainly only prevalent bad channel, to increase the transmission power very fast and in particular very strongly. A polar loop transmission circuit thus has to work in a very high dynamic range of the power amplifier on the one hand and on the other hand handle a very high dynamic range with regard to the amplitude locked loop and the phase locked loop, which together form the polar loop.

Disadvantages of the concept disclosed in EP1211801 A2 are that the setting of the output power is performed via the programming of the programmable amplifier in the feedback branch. The programmable and the downstream ramp-operated amplifier thus have to provide an output signal having a high dynamic which in one case, i.e. with maximum output transmission power, is very small, and which in the other case, i.e. with a minimum output power, is very high and thus in particular gets close to the amplitude of the output signal of the transmission signal generator.

It was found out that a signal having a too high dynamic in the feedback path leads to the fact that the rectifier detector for determining the amplitude actual signal has to be implemented very expensively. Even more serious is the fact that the amplitude limiter required for generating the phase actual signal also has to be implemented very expensively, as, when the input signal becomes very small within the same, it requires an extremely high amplification in order to achieve an amplitude limitation in order to provide a phase actual signal. This has to be guaranteed in any case, however, because as soon as the amplitude limiter for the generation of the phase actual signal provides no defined output signal any more, the phase locked loop of the polar loop comes out of lock, which leads to a complete loss of the data transmission. In other words, a failure of the phase locked loop of the polar loop leads to the fact that the message connection is immediately interrupted and that it has to be waited up to a new synchronization, which is cumbersome and not tolerable, as it may easily be seen.

SUMMARY OF THE INVENTION

It is the object of the present invention to provide an improved transmission concept operating securely and reliably and wherein simultaneously requirements for certain elements are reduced so that a transmitter may be manufactured at low cost.

In accordance with one aspect, the present invention provides a transmission stage for providing an input signal to a control input of an amplifier, further comprising an amplification control input and a signal output, having a signal input for receiving a nominal signal to be transmitted; a controllable oscillator having a frequency control input and an oscillator output, wherein the oscillator output may be operatively coupled to the signal input of the amplifier; a feedback path having a feedback path amplifier having a variable amplification; a phase regulation means for generating a frequency control signal for the frequency control input of the controllable oscillator, wherein the phase regulation means is operatively coupled to the feedback path in order to receive an actual signal, and wherein the phase regulation means is further operatively coupled to the signal input in order to receive the nominal signal; an amplitude regulation means for generating an amplification control signal for the amplification control input of the amplifier, wherein the amplitude regulation means is operatively coupled to the feedback path in order to receive the actual signal, and wherein the amplitude regulation means is coupled to the signal input in order to receive the nominal signal; and a control means for controlling a mean power level of a signal at the control output of the amplifier, wherein the control means is implemented in order to control the amplitude regulation means depending on a request for a change of the mean power level, in order to generate a changed amplification control signal using the actual signal and/or the nominal signal and simultaneously vary an amplification of the feedback path amplifier so that an amplitude of a signal in the feedback path which is in the signal flow behind the feedback path amplifier which is equal to the actual signal or which may be derived from the actual signal, remains in a predetermined range, and wherein the control means is further implemented in order to reduce the amplification of the feedback path amplifier in a request for a higher mean power level and to control the amplitude regulation means so that the amplification control signal causes an amplification increase of the amplifier, and in order to increase the amplification of the feedback path amplifier in a request for a lower mean power level and to control the amplitude regulation means so that the amplification control signal causes an amplification decrease of the amplifier.

The present invention is based on the finding that the transmission power regulation may not be performed such that the phase locked loop of a polar loop circuit is affected too strongly. Instead, according to the invention, the actual signal from which the phase actual signal is derived is maintained in a limited range which is preferably relatively small, such that the actual signal from which the phase actual signal is derived is independent of an output power of the amplifier and substantially constant. The amplification regulation is instead achieved by the fact that either the actual signal used for the amplitude regulation or preferably the nominal signal used for the amplitude regulation are correspondingly modified in order to obtain a signal with a higher power level or a signal with a lower power level at the output of the power amplifier. In other words this means that in an inventive polar loop circuit in the feedback path a controllable amplifier is provided operated such that its output signal is in a predetermined range and is preferably substantially constant, while the amplitude regulation means forming part of the amplitude regulation loop of the inventive polar loop circuit is implemented in order to either correspondingly vary the actual signal in the amplitude regulation means and/or the nominal signal in the amplitude regulation means so that on the output side, i.e. at the signal output of the power amplifier, a signal with the correspondingly varied power level is present.

It is one advantage of the present invention, that the actual signal which is fed into the phase regulation means is present in a well-defined dynamic range which is preferably very small and in an especially preferred embodiment degenerates to a substantially constant value. Thus it is guaranteed that the phase locked loop does not come out of lock in a strong change of level but easily keeps on working in order to emboss the phase information in the signal to be transmitted to the amplified signal output by the power amplifier.

It is a further advantage of the present invention, that the security requirements for a reliable functionality of the phase locked loop may easily be fulfilled by the fact that parts of the phase regulation means, and in particular an amplitude limiter for generating the phase actual signal out of the actual signal may be implemented in a simple way. As the input signal in the limiter before the phase-frequency detector lies in a well-defined not strongly varying dynamic range, here a reasonable limiter may be provided leading to a reduction of the overall costs of the polar loop transmission circuit, wherein this reduction of the overall costs causes no quality reduction at all but leads to a reliability increase of the concept.

It is a further advantage of the present invention that for a power variation only one further controllable amplifier either for amplifying the actual signal or for amplifying the nominal signal has to be provided, wherein the requirements for this amplifier are not severe either. If an amplifier is provided for amplifying the actual signal into the amplitude regulation means, then the input dynamic range into this amplifier is well-known, as the same is present in a predetermined range and preferably even constant. Thus, an amplifier especially developed for this purpose may be used that need not be designed with regard to its dynamic and in particular with regard to a strongly varying input signal. In addition to this, this amplifier only needs to be an audio amplifier if the inventive polar loop circuit includes a mixer in the feedback branch in order to convert the feedback signal with a transmission frequency $f_2$ to an easily controllable IF frequency $f_1$ for which an amplifier design may easily be implemented.

If, however, as it is the case in one preferred embodiment of the present invention, a power regulation of the output line of the power amplifier is performed in a corresponding requirement of a field strength measurement means using the nominal signal in the amplitude regulation means, then no intervention at all into a locked loop itself has to be performed. Instead, the nominal signal of the transmission means, whose amplitude ratios and mean power levels are known or arbitrarily conditionable, respectively, may easily be modified, so that for the one or the two further amplifiers, respectively, operating "in concert" with the amplifier in the feedback branch, no substantial costs are to be expected.

BRIEF DESCRIPTION OF THE DRAWINGS

In the following, preferred embodiments of the present invention are explained in more detail with reference to the accompanying drawings, in which.

DESCRIPTION OF THE PREFERRED EMBODIMENTS

Figure 1:
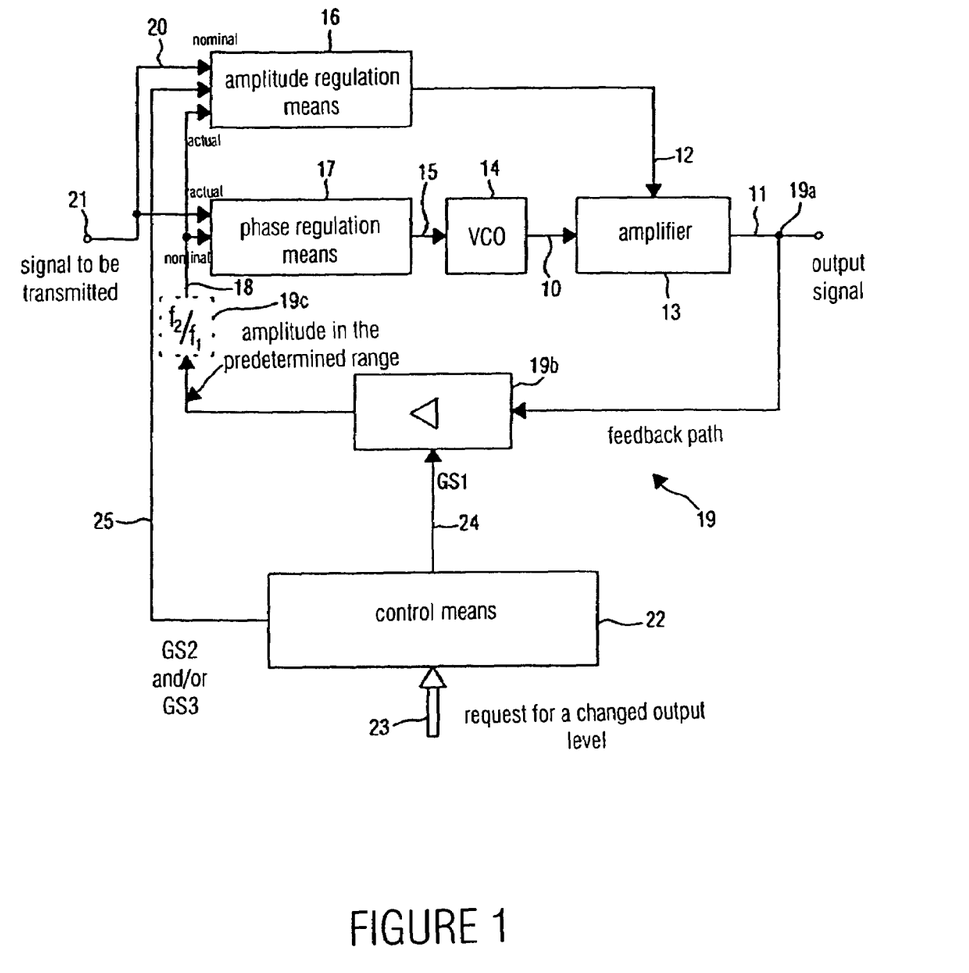
FIG. 1 shows a block diagram of an inventive transmission stage.

FIG. 1 shows a block diagram of an inventive transmission stage for providing an input signal in an amplifier input designated by 10 in FIG. 1. The amplifier further includes an amplifier output 11 and a control input 12. The amplifier itself is designated by 13 in FIG. 1.

The amplifier is preferably an amplifier operating in the non-linear operation. If the amplifier is a bipolar transistor, then the amplification control is operated via the supply voltage. The amplification control signal applied to the amplification control input will in this case cause a supply voltage variation. If the amplifier is a field effect transistor amplifier, however, then it is preferred to control the amplification of the amplifier via the working point of the same. The control input 12 is therefore operable in order to vary a drain-source voltage or a gate-source voltage or both in the characteristic curve field according to the example according to the tables or also by feedback.

The transmission stage includes a controllable oscillator 14 designated by VCO in FIG. 1. Preferably, voltage-controlled oscillators are preferred. Alternatively, of course also for example current-controlled oscillators may be used. In case of current-controlled oscillators, the control signal fed into the oscillator 14 at a control input 15 is a current, while when the VCO 14 is voltage controlled, the control signal into the control input 15 of the VCO 14 is a voltage.

As usual for polar loop circuits, further an amplitude regulation means 16 and a phase regulation means 17 are provided. While the phase regulation means 17 is coupled to the control input 15 of the controllable oscillator 14 on the output side, the amplitude regulation means 16 is coupled to the amplification control input 12 of the amplifier 13 on the output side. Both, the phase regulation means 17 and the amplitude regulation means 16 receive an actual signal 18 which is applied to the output of a feedback path 19. The feedback path 19 includes a branching means 19a via which a part of the output signal is branched at the amplifier output 11. For RF applications, i.e. when the output signal of the amplifier 11 comprises a frequency in the RF range, hereby a correspondingly implemented directional coupler, e.g. in strip line technology, may be used.

The feedback path 19 further includes a variable feedback path amplifier 19b controllable via a control input, i.e. using the amplification control signal GS1. At the output of the feedback path amplifier 19b an amplified feedback signal is present which is an amplitude in predetermined range, as it is described in the following. Optionally, in the feedback path 19 further a frequency conversion means 19c is provided in order to operate the phase regulation means 17 or the amplitude regulation means 16, respectively, in an intermediate frequency range. In this case, the frequency of the output signal of the amplifier 19b, which is for example $f_2$, is converted to a lower intermediate frequency $f_1$. To this end, a normal mixer/local oscillator combination may be used in block 19c.

Independent of the fact, whether in the feedback path 19 the frequency conversion means 19c is present or not, at an output of the feedback path 19, i.e. in the signal flow downstream from the feedback path amplifier 19b, the actual signal is applied which is fed into the phase regulation means 17 on the one hand and into the amplitude regulation means 16 on the other hand. As it is implemented in the following, the actual signal is processed into an actual phase signal in the phase regulation means. Analog to this, the actual signal 18 is processed into an actual amplitude signal in the amplitude regulation means 16.

Both, the amplitude regulation means 16 and the phase regulation means 17 further receive a nominal signal 20 applied to a signal input 21 provided for receiving a signal to be transmitted. The nominal signal 20 is processed in the phase regulation means 17 in order to obtain a nominal phase signal. Correspondingly, the nominal signal 20 is processed in the amplitude regulation means 16 in order to obtain a nominal amplitude signal.

As it is known in the art, both the amplitude regulation means 16 and the phase regulation means 17 operate so that in connection with the VCO 14 or the amplifier 13, respectively, the difference between the nominal signal 20 and the actual signal 18 becomes smaller or in the ideal case becomes zero, respectively. In this case, the VCO 14 embosses the phase characteristic of the signal to be sent at the input 21 onto the output signal at the output of the amplifier 11. Analog to this, the amplifier 13 embosses the amplitude characteristic of the signal 21 to be sent onto the output signal at the amplifier output 11, on the one hand, however, with another frequency, i.e. the RF transmission frequency, and in addition to that with a substantially higher amplitude, i.e. the RF transmission amplitude which is typically by far higher than the amplitude of the signal to be transmitted applied to the input 21.

The inventive transmission stage further includes a control means 22 which is implemented in order to, when it receives a request for a changed output level via a request input 23, both controls the feedback path amplifier 19b via a feedback path amplifier control output 24 and simultaneously controls the amplitude regulation means 16 via an amplitude regulation means input 25. To this end, on the one hand the amplification control signal GS1 is output via the input 24. On the other hand, via the output 25 an amplification control signal GS2 and/or an amplification control signal GS3 are fed into the amplitude regulation means 16.

The difference between the nominal signal 20 and the actual signal 18 in the amplitude regulation means 16 is finally responsible for how big the "error signal" is at the output of the amplitude regulation means 16 which is supplied to the amplifier by the control input 12. According to the invention, the difference between the nominal signal 20 and the actual signal 18 within the amplitude regulation means 16 is varied depending on a value obtained from the request input 23, so that the phase regulation means 17 so to speak does not "notice" this changed request using its nominal signal 20 and its actual signal 18. The phase regulation means 17 thus operates unaffected by a request for a changed output level and may always show a correct performance in so far that it is not "troubled" above its limits and if applicable comes out of lock. A coming out of lock of the phase locked loop formed by the phase regulation means 17, the VCO 14 and the feedback path 19 would inevitably lead to a communication breakdown between a transmitter and a receiver.

So that this does not happen, the control means 22 is implemented in order to control a mean power level of a signal at the signal output 11 of the amplifier 13, by the fact that depending on a request 23 for a change of the mean power level the amplitude regulation means 16 is controlled in order to vary the actual signal 18 and/or the nominal signal 20 within the amplitude regulation means 16 and simultaneously vary an amplification (GS1) of the feedback path amplifier 19b, so that the amplitude of the output signal of the amplifier 19b, i.e. the amplitude of the signal in the feedback path 19 remains in the signal flow downstream of the feedback path amplifier 19b in a predetermined range. It is to be noted that the output signal of the amplifier 19b, if no frequency conversion means is present, is directly equal to the actual signal 18, while in the case in which a frequency conversion 19c is present, the actual signal 18 is derived from the output signal of the amplifier 19b.

If the request at the request input 23 is so that the output signal at the signal output 11 of the amplifier is to receive a higher mean power level, then the amplifier 19b will amplify the signal branched from the branching means 19a less, so that at the output of the amplifier 19b the amplitude is again in the predetermined range which preferably "degenerates" to a constant value or to a very small range within conventional signal oscillations. In order to actually obtain the amplification increase at the signal output 11 of the amplifier 13, the control means 22 will control the amplitude regulation means 16 via the output 25 such that the differential signal at the output of the amplitude regulation means increases, wherein it is obvious for persons skilled in the art that the direction, i.e. towards the negative or the positive direction, depends on how the characteristic curve of the amplifier 13 is formed, i.e. the connection between amplifier control signal and actual amplification V of the amplifier 13.

The difference at the output of the amplitude regulation means 16 may be increased by e.g. increasing the nominal signal 20 within the amplitude regulation means 16 as compared to the actual signal 18 or by decreasing the actual signal 18 within the amplitude regulation means 16 as compared to the nominal signal 20 or by both increasing the nominal signal and decreasing the actual signal.

If the request at the input 23 in the control means 22 is such, however, that the signal level at the output of the amplifier 13 is to be decreased, which is the case for example when e.g. a mobile telephone determines a good connection to a base station, then the amplifier 19b in the feedback path 19 is controlled in order to increase its amplification, while the amplitude regulation means 16 is controlled via the output 25 of the control means 22 in order to decrease the error signal at the output. This may either be performed when the nominal signal 20 is decreased as compared to the actual signal, when the actual signal 18 is increased as compared to the nominal signal 20 or when both signals are oppositely changed analog to the preceding case.

At this point it is to be noted that amplification means in the form of the amplifier 19b in the feedback path 19 and amplification means within the amplitude regulation means 16 discussed in the following may as well be implemented as attenuation members, wherein in this case a negative amplification corresponds to an attenuation. Only for reasons of clarity of the representation, amplification is mentioned in the following, wherein amplifications may also include negative amplifications, i.e. attenuations.

In addition to this it is to be noted that the output signals of the illustrated blocks shown in FIG. 1 are "operatively coupled" to the following blocks shown in FIG. 1, which means that not actually as physical component, like e.g. the output of the VCO 14, is directly coupled to a transistor input within the amplifier 13 without there being any further circuits in between. "Operatively coupled" instead means, that e.g. between the VCO output and the amplifier input e.g. a matching circuit in the form of an impedance transformation circuit may be provided, which does not change anything about the information content of the transmitted signal, which, however, does well change e.g. the input impedance of the amplifier 13 which the VCO 14 "sees". Correspondingly, at the outputs of means 16 and 17 still further amplifiers, inverters or other signal processing circuits may be provided, which cause signal modifications, do not change anything about the fact, however, that for example the output of the amplitude regulation means 16 is "operatively coupled" to the amplification control input 12 of the amplifier 13.

In the following, with reference to FIG. 2, a preferred embodiment of the present invention is explained in more detail. The phase regulation means 17 includes a first limiter 171 for limiting the nominal signal 20 designated by $S_{in}(t)$ in FIG. 2. Further, a second limiter means 172 is provided which is implemented to limit the actual signal 18. At the output of means 71 therefore a nominal phase signal is present, while at the output of means 172 an actual phase signal is applied. Those two signals are fed into a phase/frequency detector 173 which feeds the actual phase difference at a certain point of time t into a low-pass filter also designated as a loop filter in the art and designated by 174 in FIG. 2. A differential phase signal filtered by the low-pass filter 174 then represents the control signal in the VCO 14.

Figure 2:
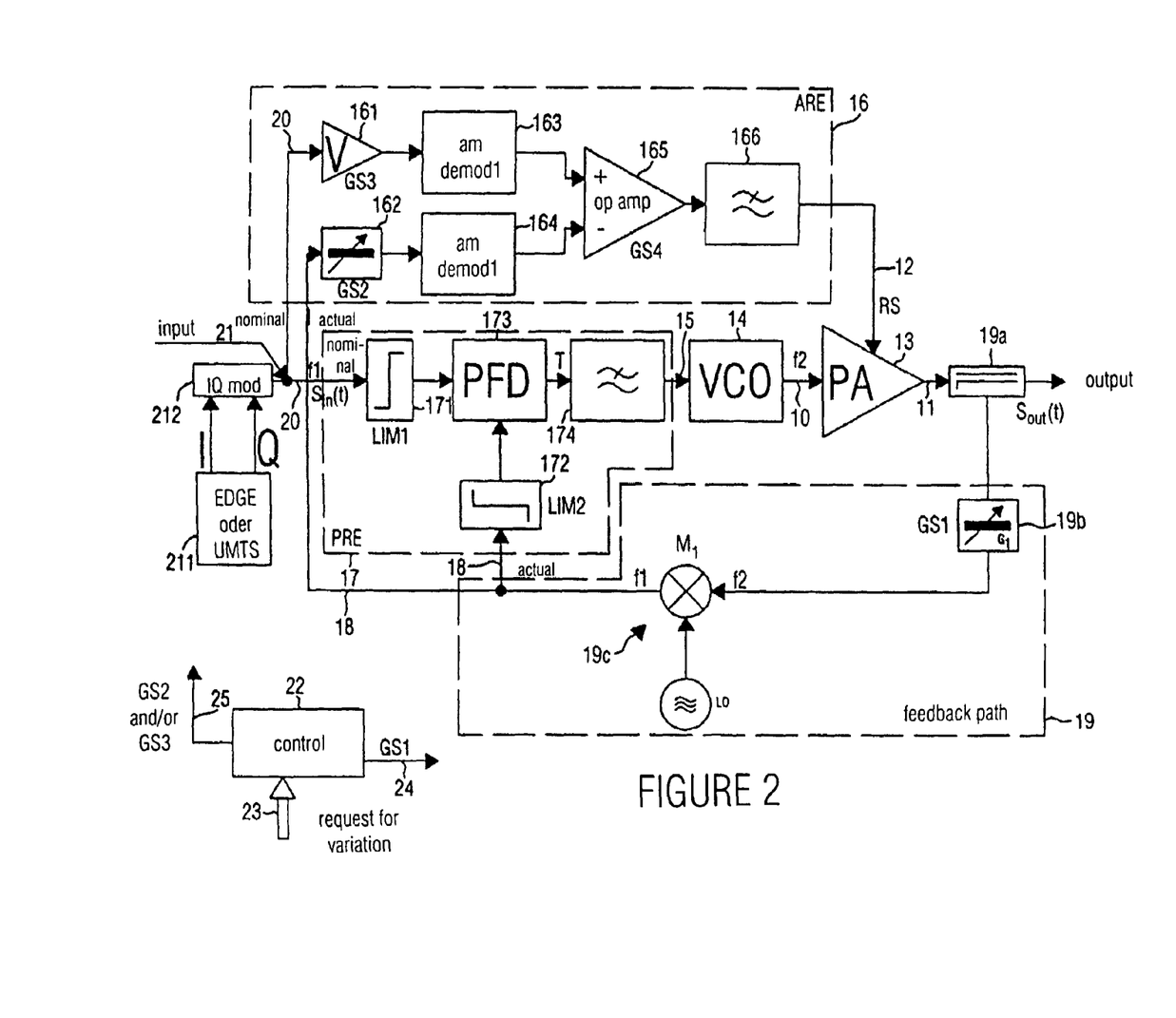
FIG. 2 shows a block diagram of an inventive transmission stage according to one preferred embodiment.

In the embodiment shown in FIG. 2, the amplitude regulation means 16, includes a nominal signal amplifier 161 having a variable amplification, wherein the amplification control signal for the nominal signal amplifier 161 is designated by GS3. Analog to this, the amplitude regulation means 16 in FIG. 2 includes an actual signal amplifier 162 drawn as a variable attenuation means and which is controllable using an amplification control signal GS2. The amplified nominal signal at the output of the nominal signal amplifier 161 is fed into a nominal amplitude demodulator 163. Correspondingly, the amplified actual signal at the output of the actual signal amplifier 162 is also fed into an actual amplitude demodulator 164. The amplitude demodulators 163 and 164 may e.g. be implemented as rectifier diode circuits or may also be implemented in any other way in order to extract the amplitude envelope of the input signal applied to the same.

At the output of the amplitude demodulator 163 for the nominal signal a nominal amplitude signal is applied which is fed into a non-inverting input of the differential amplifier 165. The amplitude actual signal applied to the output of the amplitude demodulator 164 is fed into the inverting input of the differential amplifier 165. The amplified differential signal applied to the output of the differential amplifier 165 is then fed into a low-pass filter 166 within the amplitude regulation means 16. The low-pass filter 166 then provides the amplification control signal on the output side which is fed into the amplification control input 12 of the power amplifier 13. In one preferred embodiment of the present invention it is preferred that the differential amplifier 165 also comprises a settable amplification, wherein the amplification of the differential amplifier 165 is controllable by an amplification control signal GS4.

In the preferred embodiment shown in FIG. 2, in the feedback path 19 a frequency converter 19c is provided comprising a mixer $M_1$ and a local oscillator LO implemented such as it is known in the art in order to downward-mix a signal with an RF frequency f2 to an intermediate frequency f1.

In the preferred embodiment of the present invention shown in FIG. 2, at the input 21 a signal generator is connected consisting of an EDGE or a UMTS modulator 211 and an IQ modulator 212, wherein the IQ modulator 212 is implemented in order to convert signal components generated by the EDGE or the UMTS modulator 211, i.e. an I signal and a Q signal, into a complex alternating signal at the intermediate frequency f1.

The circuit shown in FIG. 2 operates according to the concept of the polar loop signal reconstruction method. Here, PLL (phase locked loop) and ALL (amplitude locked loop) feedback loops are used. The I/Q signal of an EDGE or UMTS signal source is upward-modulated to a carrier frequency f1 in the IQ modulator 212. The amplitude information of the high-frequency modulated signal $S_{in}(t)$ is eliminated in the limiter 171. This causes that the signal only contains phase information anymore after the limiter 171.

In the phase frequency detector PFD 173 a phase comparison between the input signal at the output of the limiter 171 and a fedback part of the output signal at the output of the limiter 172 takes place. The corresponding error signal designated by T in FIG. 2 is fed to the VCO (voltage control oscillator) via the loop filter 174 comprising a low-pass character. Thus, the VCO is synchronized to a phase supplied from the outside using a center frequency of f2.

In the preferred embodiment of the present invention shown in FIG. 2, in the feedback path 19 the frequency of the output signal at the output of the converter 13 is converted in the mixer $M_1$ from f2 to f1, wherein in one preferred embodiment of the present invention the signal is correspondingly amplified or attenuated, respectively, before the mixer by the feedback path amplifier 19b. Alternatively, the amplifier 19b may also be arranged after the mixer.

After the elimination of the amplitude information of the fedback output signal in the limiter 172, the signal is supplied to the second input of the phase frequency detector 173.

The PLL loop having the phase regulation means 17 and the feedback path 19 therefore causes the phase differences to be continuously corrected resulting due to AM/PM distortions in the power amplifier 13.

The consequence is that the use of the non-linear RF power amplifier 13 which is for example a power amplifier in the class C operation, causes no spectral widening of the output signal at the output 11 of the power amplifier 13.

By the ALL loop, formed by the amplitude regulation means 16 and the feedback path 19, the envelope of the modulated input signal $S_{in}(t)$ is mapped to the output signal $S_{out}(t)$. After the detection of the amplitude information of the input signal and the fedback output signal in the two amplitude demodulators 163 and 164, the difference is formed and amplified in the operation amplifier 165, i.e. according to the amplification control signal GS4 for this differential amplifier 165. Subsequently, the amplified signal is supplied via a loop filter 166 having a low-pass character to the non-linear RF power amplifier 13 as an amplitude control signal (RS).

The controllable attenuation members/amplification members 161, 162 are used for the power variation of the non-linear RF power amplifier without the PLL loop itself being influenced. So that the PLL loop operates unaffected by the power variation of the non-linear RF transmission amplifier 13, the feedback path amplifier 19b is provided in the feedback path 19. The attenuation, i.e. negative amplification, of the amplifier 19b implemented as a controllable attenuation member, is thus the bigger the higher the signal level of the output signal $S_{out}(t)$ is.

According to the invention, thus the amplitude information from the signal generator is reconstructed by the ALL loop formed by the amplitude regulation means 16 and the feedback path 19, for example by performing a working point variation of the non-linear RF power amplifier 13.

In addition to this, the output signal amplitude, i.e. the mean power level of the signal $S_{out}(t)$ at the output of the overall transmission stage is regulated by the controllable attenuation member, i.e. by the feedback path amplifier 19b, to a preferably constant value or to a predetermined range, respectively, which may e.g. be selected such that the limiter 172 always operates securely and guarantees a desired limitation in order to provide a defined output signal to the phase/frequency detector 173 so that the phase locked loop does not come out of lock with a strong power variation. Thus, the PLL loop formed by the phase regulation means 17 and the feedback path 19 remains unaffected by a power variation of the RF transmission amplifier 13 for example due to a request of a mobile phone electronics to achieve an increase/decrease of the transmission power due to a changing free-space transmission channel.

In addition to that, in the preferred embodiment of the present invention shown in FIG. 2, the signal level of the transmission amplifier is varied by amplification means 161 and 162. Thereby, the PLL loop may continue unaffected and does not come out of lock with a variation of the signal level.

In the preferred embodiment of the present invention the transmission characteristics of the two loops are set so that their bandwidths, i.e. the cut-off frequencies of the low-passes 166 and 174 are selected so that the transmission of the EDGE signal and the UMTS signal are possible without problems. This is achieved by the fact that the bandwidths are so large that due to the locked loops no information loss occurs. A useful bandwidth to be considered for UMTS and EDGE is at 2 MHz.

The amplification of the differential amplifier 165 is preferably set so that a complete mapping of the amplitude information onto the output signal results.

Figure 5A:
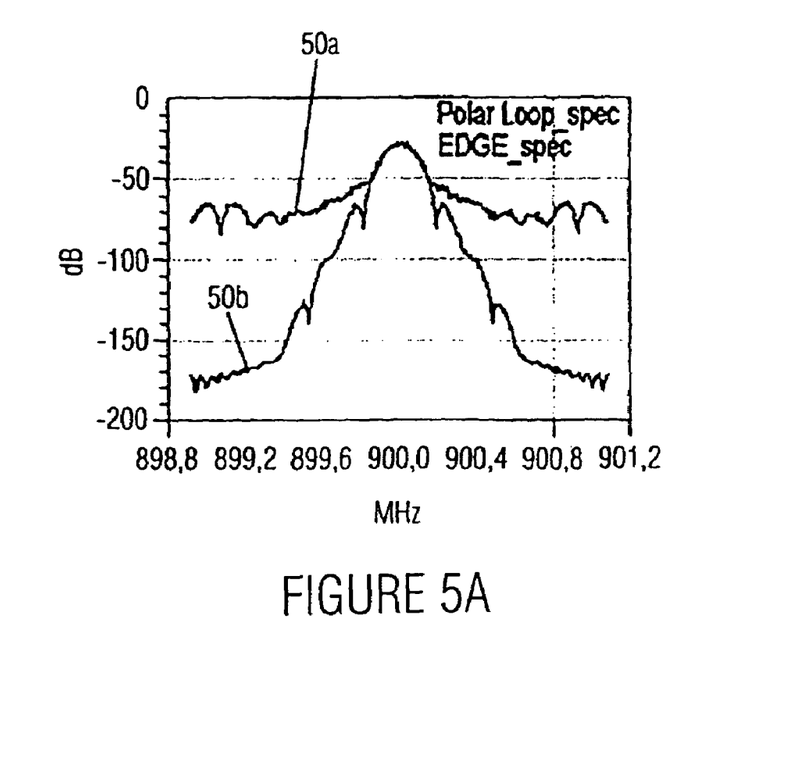
FIG. 5a shows a comparison of an EDGE spectrum and a polar loop spectrum before optimizing the polar loop.
Figure 5B:
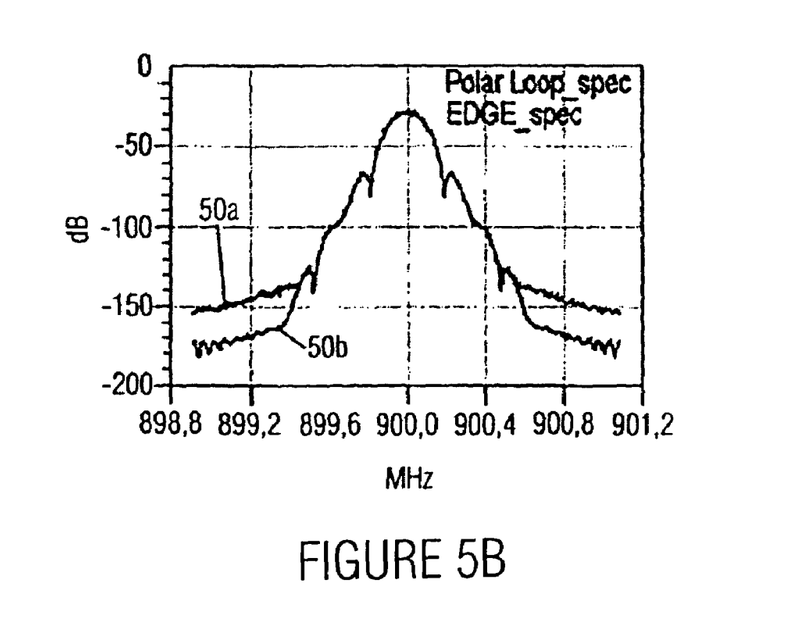
FIG. 5b shows a comparison of the EDGE spectrum and the polar loop spectrum after optimizing the polar loop using the amplification of the differential amplifier in the amplitude regulation means.

To this point, reference is made to FIGS. 5a and 5b. FIG. 5a shows a spectrum of a polar loop illustrated in FIG. 2 before an optimization. The spectrum is designated by 50a in FIG. 5a. For comparison purposes, in FIG. 5a further a spectrum according to the EDGE specification is shown, designated by 50b. It may be seen from FIG. 5a that the two spectrums only "lie on top of each other" in a narrow range around the center frequency, that the polar loop is not yet sufficiently optimized, however, when higher offset frequencies, i.e. frequency distances from the center frequency are used at 900 MHz. FIG. 5b shows a state after an optimization in which in comparison to FIG. 5a the amplification of the operational amplifier 165 in FIG. 2 was increased. The increase of the amplification factor GS4 in FIG. 5b as compared to an optimization start value in FIG. 5a leads to the fact that the polar loop spectrum 50a so to speak "lays" onto the EDGE spectrum 50b, i.e. up to a range of about 100 dBc. At this point it is to be noted, that too high values of GS4 cause a continuous increase of the loop amplification of the amplitude locked loop, so that, as it is generally known for locked loops, the oscillation tendency continuously increases. It is therefore preferred to make the increase of the operational amplifier 165 so high that the polar loop is sufficiently selective in order to fulfill requested side channel specifications, that, however, the amplification of the differential amplifier 165 is not further increased without force, so that the amplitude locked loop operates securely and does not start to oscillate due to the high loop amplification.

Figure 3:
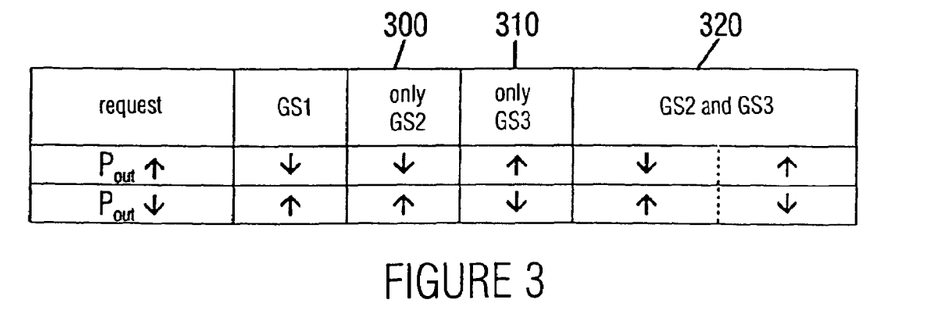
FIG. 3 shows a tabular overview of the control of the different preferably usable amplifiers in the amplitude regulation means.

In the following, with reference to the table shown in FIG. 3, it is illustrated, how the individual amplification factors have to be changed when corresponding requests for a higher or lower output power $P_{out}$ take place. It is to be noted here, that the table in FIG. 3 considers three cases, i.e. that only the amplifier 162 is changed via GS2 in the amplitude regulation means (column 300), that only the amplifier 161 in the amplitude regulation means 16 of FIG. 2 is changed (column 310), or that both the amplifier 162 (GS2) and the amplifier 161 (GS3) are changed (column 320). As it was already discussed above, it is preferred to use the case illustrated in column 310, as in this case the actual signal 18 does not have to be touched, but only the nominal signal at the input 21 of the circuit.

If a request for an increase of the output power is obtained from the control means 22 in FIG. 2, first of all the amplification of the feedback path amplifier 19b has to be decreased. The amplification of the amplifier 162 also has to be decreased in this case, if case 300 is present. If, however, case 310 is present, then the amplification of the amplifier 161 has to be increased. If, however, case 320 is present, then GS2 has to be decreased and GS3 has to be increased.

In case of a request for a decrease of the output power, the amplification of the feedback path amplifier 19b has to be increased. In case of column 300, GS2 is increased. In case of column 310, GS3 is decreased. In case of column 320, GS2 is increased and GS3 is decreased.

The control value GS1 is thus set depending on the output power of the transmission amplifier. E.g., with an increase of the output power of the transmission amplifier by e.g. 5 dB (by GS2 and/or GS3), the signal in the controllable attenuation member GS1 has to be attenuated by approximately 5 dB. This provides that the signal always has the same power level after the controllable attenuation member GS1, i.e. is maintained stabilized and constant. The control values GS2 and/or GS3 (depending on the implementation) are responsible for the power variation of the transmission amplifier according to the EDGE and the UMTS standard (3GPP). By this, the differential span in the operational amplifier between the input signal and the fedback output signal is varied depending on the requirement of the output power of the transmission amplifier. The control value of the operational amplifier is preferably set fixed for the EDGE standard or the UMTS standard. In the steady-state condition, the resulting error signal in the ALL loop caused by the non-linearity of the system, is amplified in the operational amplifier by the control value GS4 so far that the spectrum of the output signal for the EDGE standard at +/−200 kHz and +/−300 kHz gets better than −54 dBc or −60 dBc, respectively, as it was illustrated with regard to the FIGS. 5a and 5b.

At this point it is to be noted, that according to the UMTS standard the spectrum of the output signal of the amplifier has to be better than −45 dBc in the overall neighboring channel.

It is further to be noted that it is preferred according to the invention to set the bandwidths of the amplitude locked loop and the phase locked loop so that a transmission of the EDGE signal and (simultaneously) the UMTS signal is possible.

Figure 4A:
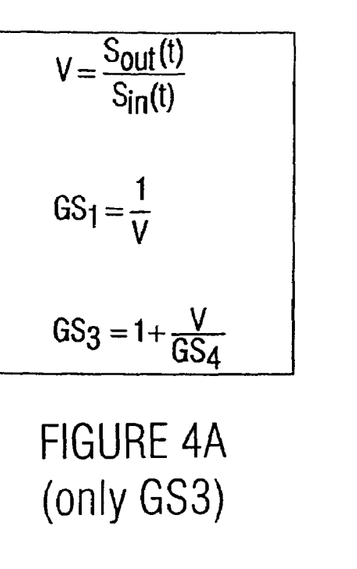
FIG. 4a shows an illustration of an equation of the dependencies of the amplifier control signals for a certain amplification in the forward branch for a nominal signal modification.
Figure 4B:
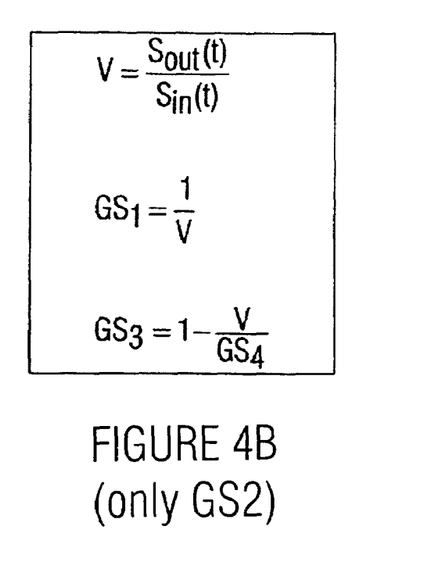
FIG. 4b shows an exemplary illustration of the equation-relating connections for a certain amplification V in the forward branch for an actual signal modification.

In the following, using FIGS. 4a and 4b, a uniform connection for the individual values is given when the ratio of $S_{out}(t)$ at the output of the directional coupler 19a to $S_{in}(t)$ at the input of the limiter 172 is assumed to be V. FIG. 4a relates to the case of the column 310 in FIG. 3, while FIG. 4b relates to the case of column 300 in FIG. 3.

Although it was indicated in the above embodiment that the actual signal 18 and/or the nominal signal 20 are varied by the amplification means 161, 162 according to the variation requirements to the control 22, it is to be noted, that alternatively also the output signal of the demodulator 163 and/or the output signal of the demodulator 164 may be varied in order to generate a changed amplification control signal at the output of the amplitude regulation means 16 according to the power requirements, as long as the amplification control signal at the output of the amplitude regulation means 16 leads to a correspondingly varied output power of the amplifier. Simultaneously, the feedback path amplifier 19b is controlled inversely proportional according to the changed amplification in order to maintain the actual signal fed into the phase regulation means 17 in the predetermined range, which, as it has been implemented, may in principle be made as small as possible and is in the ideal case degenerated to a substantially constant value independent of the actual amplification of the amplifier 13.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A transmission stage for providing an input signal to an amplifier input of an amplifier, the amplifier further comprising control input and an amplifier output, comprising:
   a signal input for receiving a nominal signal to be transmitted;
   a controllable oscillator having a frequency control input and an oscillator output, wherein the oscillator output may be operatively coupled to the amplifier input of the amplifier;
   a feedback path having a feedback path amplifier having a variable amplification;
   a phase regulator for generating a frequency control signal for the frequency control input of the controllable oscillator, wherein the phase regulator is operatively coupled to the feedback path in order to receive an actual signal, and wherein the phase regulator is further operatively coupled to the signal input in order to receive the nominal signal;
   an amplitude regulator for generating an amplification control signal for the control input of the amplifier, wherein the amplitude regulator is operatively coupled to the feedback path in order to receive the actual signal, and wherein the amplitude regulator is coupled to the signal input in order to receive the nominal signal; and
   a controller for controlling a mean power level of a signal at the amplifier output of the amplifier, wherein the controller is implemented in order to control the amplitude regulator depending on a request for a change of the mean power level so that the amplitude regulator generates a changed amplification control signal using the actual signal and/or the nominal signal, the controller further being operative to simultaneously vary an amplification of the feedback path amplifier so that an amplitude of a signal in the feedback path located in the signal flow behind the feedback path amplifier, the signal being equal to the actual signal or being derivable from the actual signal, remains in a predetermined range, and
   wherein the controller is further implemented in order to reduce the amplification of the feedback path amplifier in a request for a higher mean power level and to control the amplitude regulator so that the amplification control signal causes an amplification increase of the amplifier, and wherein the controller is further implemented in order to increase the amplification of the feedback path amplifier in a request for a lower mean power level and to control the amplitude regulator so that the amplification control signal causes an amplification decrease of the amplifier.

2. The transmission stage according to claim 1, wherein the amplitude regulator comprises a variable nominal amplifier for the nominal signal, and wherein the controller is implemented in order to increase the mean power level, reduce the amplification of the variable feedback path amplifier and increase an amplification of the variable nominal amplifier upon the request, or wherein the controller is implemented in order to decrease the mean power level, increase the amplification of the variable feedback path amplifier and decrease the amplification of the variable nominal amplifier upon a request.

3. The transmission stage according to claim 1, wherein the amplitude regulator comprises a variable actual amplifier for amplifying the actual signal, and wherein the controller is implemented in order to increase the mean power level, reduce the amplification of the variable feedback path amplifier and reduce the amplification of the variable actual amplifier upon the request, or wherein the controller is implemented in order to reduce the mean power level, increase the amplification of the feedback path amplifier and increase the amplification of the variable actual amplifier upon a request.

4. The transmission stage according to claim 1, wherein the feedback path amplifier is implemented as a variable attenuation member which is controllable in order to perform a negative amplification in the negative dB range.

5. The transmission stage according to claim 1,
   wherein the amplitude regulator comprises a differential amplifier and a downstream low-pass filter,
   wherein an output signal of the low-pass filter may operatively be coupled to the control input of the amplifier,
   wherein the amplitude regulator further comprises a nominal amplitude demodulator coupled to a non-inverting input of the differential amplifier, and wherein the amplitude regulator further comprises an actual amplitude demodulator operatively coupled to an inverting input of the differential amplifier.

6. The transmission stage according to claim 1,
wherein the phase regulator comprises a phase/frequency detector and a downstream phase low-pass filter,
wherein an output signal of the phase low-pass filter is operatively coupled to the frequency control input of the controllable oscillator, and
wherein the phase regulator further comprises a nominal phase detector coupled to a first input of the phase/frequency detector, and
wherein the phase regulator further comprises an actual phase detector operatively coupled to a second input of the phase/frequency detector.

7. The transmission stage according to claim 6, wherein the actual phase detector comprises a predetermined input dynamic range, wherein the predetermined range of the signal that may be generated in the signal flow behind the feedback path amplifier is smaller than or equal to the predetermined input dynamic range of the actual phase detector.

8. The transmission stage according to claim 7, wherein the actual phase detector comprises a limiter circuit.

9. The transmission stage according to claim 1, wherein the signal to be transmitted comprises a first carrier frequency $f_1$ and the signal at the amplifier output of the amplifier comprises a second carrier frequency $f_2$, wherein in the feedback path further a frequency converter is provided for converting the second carrier frequency to the first carrier frequency.

10. The transmission stage according to claim 9, wherein the frequency converter is provided in the signal flow behind the variable feedback path amplifier.

11. The transmission stage according to claim 1, wherein the signal to be transmitted is amplitude-modulated and phase-modulated at the signal input according to a GSM (Global System for Mobile Communication) EDGE (Enhancement Data Radio for GSM Evaluation) standard or according to a UMTS (Universal Mobile Telecommunications System) standard.

12. The transmission stage according to claim 1, wherein the controller comprises a controller in which as an input value a power variation and as an output-value an amplification value to be generated for the feedback path amplifier and an amplification value for an amplifier within the amplitude regulator for varying the amplification control signal are provided.

13. The transmission stage according to claim 1, wherein the controller is implemented in order to receive the request for a mean power level change from a field strength determination element of a cellular radio transmission/reception device.

14. The transmission stage according to claim 5, wherein the differential amplifier comprises a settable amplification GS4 which is selected so that a neighboring channel specification of a radio specification valid for the transmission stage is fulfilled, wherein the settable amplification GS4 is maintained on a fixed value in an operation of the transmission stage.

15. The transmission stage according to claim 1, wherein cut-off frequencies of the amplitude regulator and the phase regulator are sized so that by the amplitude regulator and the phase regulator no information loss occurs.

16. The transmission stage according to claim 1, wherein the controller is implemented in order to control the variable feedback path amplifier so that the predetermined range is smaller than a dynamic range that may be generated by a request for a maximum change of the mean power level of the signal at the amplifier output of the power amplifier.

17. The transmission stage according to claim 1, wherein the predetermined range includes a deviation by a nominal value for the amplitude of the signal in the signal flow behind the feedback path amplifier within a variation bandwidth of +/−10% for any power level variations.

18. A method for providing an input signal to an amplifier input of an amplifier, the amplifier further comprising a control input and an amplifier output, the method comprising:
receiving a nominal signal to be transmitted via a signal input;
generating a frequency control signal for a frequency control input of a controllable oscillator by a phase regulator, the controllable oscillator further comprising an oscillator output, wherein the oscillator output may be operatively coupled to the amplifier input of the amplifier;
coupling the phase regulator to a feedback path having a feedback path amplifier having a variable amplification so as to acquire an actual signal, and coupling the phase regulator to the signal input to acquire the nominal signal;
generating an amplification control signal for the control input of the amplifier with an amplitude regulator;
controlling a mean power level of a signal at the amplifier output of the amplifier with a controller using the following:
depending on a request for a change of the mean power level, controlling the amplitude regulator in order to generate a changed amplification control signal using the actual signal and/or the nominal signal, and simultaneously varying an amplification of the feedback path amplifier so that an amplitude of a signal in the feedback path located in the signal flow behind the feedback path amplifier, the signal being equal to the actual signal or being derivable from the actual signal, remains in a predetermined range, and wherein the controlling step comprises:
in a request for a higher mean power level reducing the amplification of the feedback path amplifier and controlling the amplitude regulator so that the amplification control signal causes an amplification increase of the amplifier, and
in a request for a lower mean power level increasing the amplification of the feedback path amplifier and controlling the amplitude regulator so that the amplification control signal causes an amplification decrease of the amplifier.

* * * * *